United States Patent

[11] 3,586,354

[72] Inventor Alan J. Boscacci
 2160 Manzanita Drive, Oakland, Calif.
[21] Appl. No. 826,157
[22] Filed May 20, 1969
[45] Patented June 22, 1971

[54] PIPE COUPLING
 4 Claims, 3 Drawing Figs.
[52] U.S. Cl..................................................... 285/369,
 285/420
[51] Int. Cl..................................................... F16l 17/02
[50] Field of Search............................................ 285/369,
 236, 417, 420, 373; 24/19, 374

[56] References Cited
UNITED STATES PATENTS
1,671,161  5/1928 Perks............................. 285/337 X
2,530,700  11/1950 Jewell et al..................... 285/369 X FOREIGN PATENTS
251,987  1/1967 Austria............................ 285/369
1,520,734  3/1968 France............................ 285/369

Primary Examiner—Dave W. Arola
Attorney—Flehr, Hohbach, Test, Albritton & Herbert ABSTRACT: Pipe coupling incorporating a resilient cylindrical gasket for surrounding adjacent pipe ends. Band clamps secure the gasket to the pipe sections. A rigid housing is provided for receiving both the band clamps in each end thereof and the gasket, the housing being arranged to encircle and accommodate within itself both the clamps and the gasket in a unitary, easy-to-install structure.

PATENTED JUN22 1971  3,586,354

INVENTOR.
Allan J. Boscacci
BY Flehr, Hohbach, Test,
Albritton & Herbert
Attorneys 3,586,354

PIPE COUPLING

BACKGROUND OF THE INVENTION

This invention relates to pipe couplings and particularly to pipe couplings of the type used for the flangeless connection of adjacent ends of plain end pipe.

Such flangeless fittings are used in piping installations having controlled noise characteristics and facilitate lower cost installation due to ease of assembly to the piping.

Among the objects of the present invention is to provide a flangeless pipe coupling capable of permanently and reliable joining pipe sections and that the coupling effectively resist misalignment of the sections.

Another object is to provide a coupling of the above character having high strength and capable of resisting deterioration from abrasion.

A further object of the invention is to provide a unitary pipe coupling in which a resilient gasket and clamping elements are preassembled within a protective housing to form a single, unitary assembly ready for installation as a unit into a pipe system.

SUMMARY OF THE INVENTION

The above objects and features of the invention are achieved by providing a rigid, cylindrical housing which is adapted to capture a pair of band clamps and the resilient gasket within itself and to retain them as a unitary structure ready for installation. The housing is cylindrical in form having radially inwardly facing annular recesses at each end for receiving band clamps which are installed and expanded to seat or lie within a respective recess. Notches are provided in the housing so that the adjustment screw of the clamp extends through the wall of the housing and is accessible to the exterior for tightening. Shoulders are provided at each end of the housing for forming a second recess extending the length thereof. After the band clamps have been positioned, the gasket is collapsed and slid within the housing where it opens into a relaxed position and is captured within the housing by the end shoulders.

These and other features and objects of the invention will become apparent from the following description when taken in conjunction with the accompanying drawings.

DESCRIPTION OF THE PREFERRED EMBODIMENTS

Figure 1:
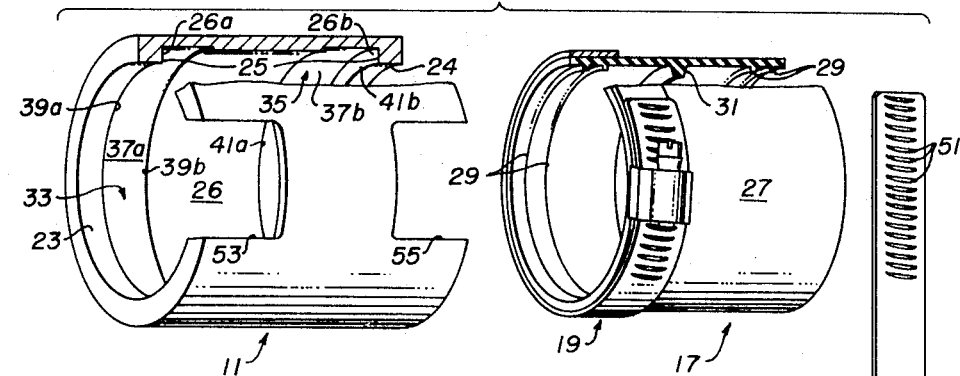
FIG. 1 is an exploded view with certain portions broken away of a pipe coupling constructed in accordance with the present invention.
Figure 2:
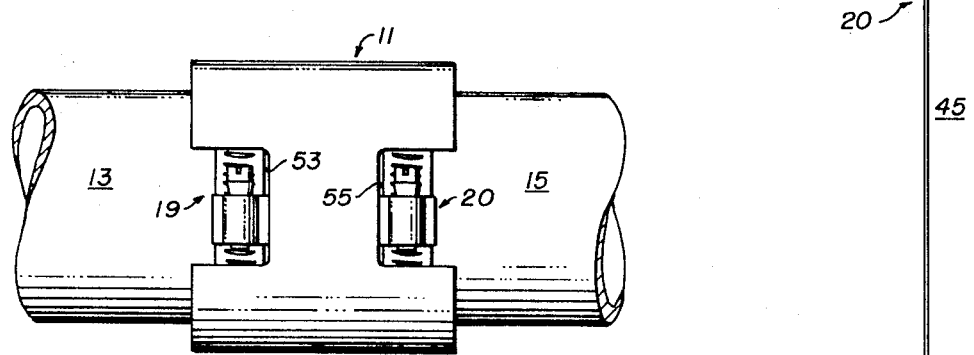
FIG. 2 is a view showing a completed installation of the pipe coupling of FIG. 1 in a piping system.

The pipe coupling of the present invention generally includes a cylindrical housing 11 of sleeve form having a continuous rigid wall constructed of solid material such as cast iron or ABS plastic. The housing extends axially for a distance sufficient to bridge the ends of axially aligned, adjacent pipe sections 13 and 15. The housing serves to capture and retain a cylindrical gasket 17 and a pair of spaced clamping bands 19 and 20. The bands are arranged to surround and radially compress and engage each end of the gasket into sealing engagement with the corresponding pipe end.

Housing 11 is formed in the shape of a right circular cylinder and provided with means forming inwardly projecting annular retaining shoulders or ridges 23, 24 at each end, which, together with wall or surface 26, serve to define an inwardly facing circumferential cylindrical recess 25 extending substantially the length of the housing and bounded at its ends by flat annular walls 26a, b.

A resilient gasket sleeve dimensional for fitting within said recess is captured therein and is restrained from slipping out by the shoulders. The gasket can be of any suitable sort, one suitable gasket being that disclosed in U.S. Pat. No. 3,233,922 to Evans and assigned to Cast Iron Soil Pipe Institute of Illinois. As shown, such a gasket consists of a cylindrical body 27 having a plurality of inwardly facing, raised annular ridges 29 at each end for establishing a compressive seal with the outer wall of the pipe. A centrally disposed radial ridge 31 extends radially inwardly sufficiently to become interposed between the ends of the pipe sections as the coupling and pipe sections are assembled.

Means forming annular recesses 33, 35 are provided for receiving a band clamp at each end of the housing. Each recess is bounded by cylindrical walls 37a, b concentric with and of greater diameter than the wall 26 of the housing and flat annular walls 39a, b, 41a, b, the former joining the respective cylindrical walls. Walls 39a, 41b can be continuous with the annular walls 26a, b of shoulders 23, 24. In this way, each of recesses 33, 35 encircles and opens through the end of recess 25. The axial extent of each of cylindrical walls 37a, b is sufficient to accommodate the width of one of a pair of band clamps 19, 20, one of which is mounted at each end of the housing and surrounding the gasket at that end.

The band clamps can be of any suitable type but preferably consist of an elongate band 45 having a worm screw 47 set for rotation in a screw mounting 49 attached at one end of the band. The other end is provided with a plurality of equally spaced, generally transverse slots 51. When the slotted end is passed as a loop through the screw housing, it is engaged by the screw therein in a manner similar to the worm and wheel gearing.

Means are provided for accommodating the housings of each band clamp and consists of generally U-shaped notches 53, 55 formed through the walls of said housing and opening axially through the respective end thereof. The notches permit the screw mounting and screw to project radially through the housing wall so that said screw can be adjusted by a suitable tool positioned externally to and approximately tangent to the wall of the housing.

No fastening operations are required in the assembly of the coupling of the present invention. The band clamps are adjusted to a diameter slightly smaller than the diameter of the shoulders 23, 24 so that they will clear the same as they are passed endwise into the respective end of the housing. This is done such that the screw housing slides into position in the respective one of notches 53, 55, after which the screw is adjusted to expand the clamp until it is captured within the respective one of recesses 33, 35. Similarly, the other band is collapsed, slid into position and expanded. The gasket is then collapsed and stuffed into the housing when it pops open into cylindrical form and is retained within the larger recess defined by the shoulders 23, 24. The above is a simple, straightforward operation requiring very little time and no permanent fastenings of the parts as by soldering, riveting or the like. As assembled, the coupling is ready for use.

Figure 3:
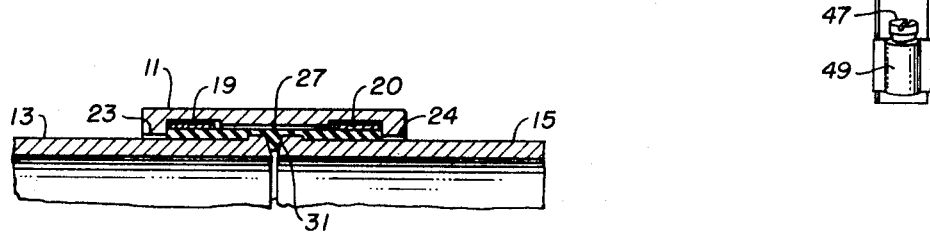
FIG. 3 is a cross-sectional view showing the arrangements of the several parts of the pipe coupling of FIG. 2.

At the time of installation, the assembled coupling is slid over the end of one pipe section until the central ridge 31 abuts the end of the pipe. Thereafter, the other pipe end is slid into the remaining end of the coupling. Once in position, each of the band clamps is tightened as with a screwdriver or socket drive to compress into compressive engagement around the gasket and include pipe wall. As shown in FIG. 3, the completed installation is characterized by enhanced protection from abrasion and jarring and provided by the inward overlap of the annular shoulders 23, 24 about each end of the gasket and band clamp so that these operative elements are completely shielded and protected. Additionally, any tendency of the pipe sections to become misaligned beyond a slight degree is counteracted by the rigidity of the housing as transmitted through the resilient gasket. In this way, ultimate rigidity is provided, while maintaining serviceability and resilience of a coupling functioning in the noise reduction of the piping systems. An additional advantage of the coupling of the present invention is that each band clamp operates directly upon the gasket without the interposition of corrugated sleeve or other form resisting material, and, the resultant seal is improved by the direct action of the clamp upon the gasket. As an additional feature, the appearance of the finished installation using the present coupling is more uniform and pleasing since the cast iron housing is of similar character to that of the piping as a whole.

I claim;

1. A pipe coupling of rigid interconnected structure ready to be installed on adjacent pipe ends comprising a cylindrical housing constructed of rigid material, first means associated with said housing for forming a cylindrical recess extending the entire length and facing radially inwardly within said housing, said means comprising an inwardly projecting annular shoulder at each end of said housing, a cylindrical gasket having a right cylindrical outer periphery of substantially uniform diameter throughout its length disposed within said recess and captured therein, second means forming spaced annular recesses at each end of said housing, said recesses encircling said cylindrical gasket and encircling and opening through the end of said first recess, a band clamp expanded radially outwardly retained in each of said last named recesses.

2. A pipe coupling as in claim 1 in which said band clamps are of the type having a screw and means for mounting the screw to the band whereby adjustment of said screw tightens or enlarges said clamp, said screw and mounting means projecting away from the band of said clamp, notch means provided at each end of said housing for permitting said screw and screw mounting to project radially away from the housing wall to a position approximately tangent with the outer surface of said housing so that said screw can be adjusted by a suitable tool positioned externally of said housing.

3. A pipe coupling comprising a rigid hollow cylindrical housing adapted to receive pipe ends therein to be coupled together, an annular recess formed at each end of the housing extending around the interior surface thereof at each end, an annular band clamp of a type to expand or contract its circumference by adjustment of a worm screw carried by the band clamp, one of said band clamps being expanded into each said recess, said recesses having a depth and width to readily receive and contain one of said band clamps therein to be restrained from moving longitudinally of the housing, passages formed radially through the housing to accommodate entry of the worm screw for each said band clamp, and a cylindrical gasket held longitudinally between the ends of said housing and adapted to receive the pipe ends therein whereby subsequent tightening of said band clamps serves to clamp the gasket to the pipe, the periphery of said gasket providing minimum radial projection from the pipe ends so as to readily receive the housing and band clamps therearound.

4. A pipe coupling assembly comprising a cylindrical gasket adapted to receive pipe ends therein, said gasket having an unobstructed outer periphery of substantially the same diameter from end to end so as to provide minimal radial enlargement thereof, a band clamp encircling each end of the gasket of a type employing a worm screw for expanding and contracting the circumference of the band clamps, a rigid, cylindrical housing enclosing said gasket and band clamps, the interior surface of said housing having annular encircling recesses of a width and depth to receive each of the band clamps expanded into same and to restrain the band clamp therein from being moved axially along the housing, openings radially through the housing to accommodate access to said worm screws of each said clamp for tightening the clamps about said gasket.